Jan. 8, 1957    C. H. STEVENS, JR    2,777,047
POWER SUPPLY FOR MULTIPLE WELDING UNITS
Filed July 8, 1953
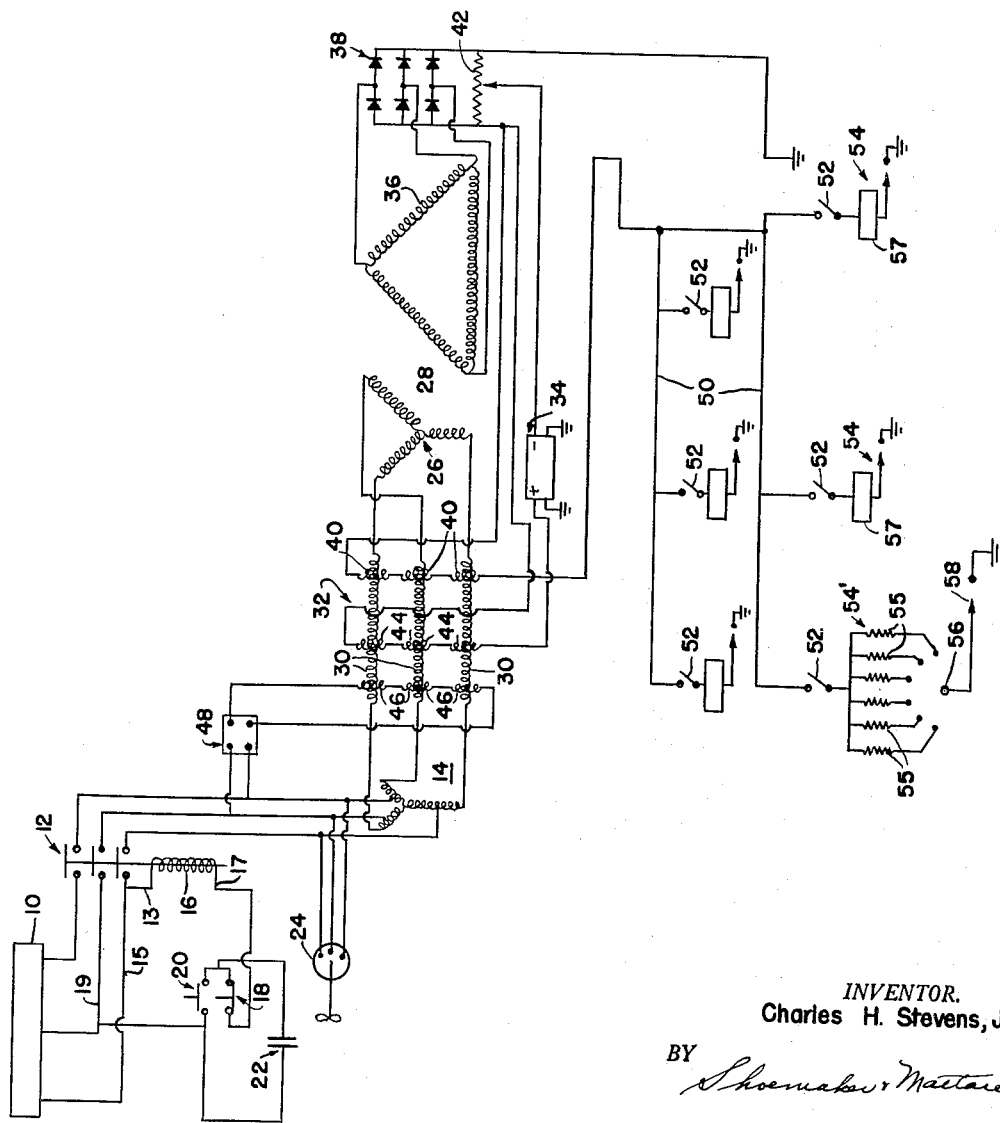
INVENTOR.
Charles H. Stevens, Jr.
BY
*Shoemaker & Mattare*
ATTORNEYS

United States Patent Office 2,777,047
Patented Jan. 8, 1957

2,777,047

POWER SUPPLY FOR MULTIPLE WELDING UNITS

Charles H. Stevens, Jr., Cornwall Bridge, Conn.

Application July 8, 1953, Serial No. 366,730

7 Claims. (Cl. 219—131)

The present invention relates to an improved power supply for electrical welding units and more particularly relates to a voltage-stabilized direct current power supply for use with multiple electrical welding units.

It is an object of the present invention to provide an improved direct current power supply for multiple welding units and the like which uses a magnetic amplifier to stabilize the direct current output voltage.

A further object of the present invention is to provide an improved circuit for direct current power supply wherein a magnetic amplifier is employed which is responsive to the alternating current supply voltage and the direct current output voltage.

Still another object of the present invention is to provide an improved circuit for supplying direct current power for multiple electrical welding units and the like wherein a magnetic amplifier is employed to maintain the output voltage substantially constant, and wherein the magnetic amplifier is controlled in part by the load current.

A still further object of the present invention is to provide an improved circuit arrangement for delivering direct current power supply to multiple welding units and the like wherein the supply and more particularly the input power is cut off when the cooling fan for the rectifier stacks is not operating.

A more particular object of the present invention is to provide an improved circuit arrangement for delivering a stabilized direct current supply to multiple welding units and the like wherein a magnetic amplifier is employed which is responsive to changes in the alternating current voltage supply, the direct current output voltage and the load current.

Still another object of the present invention is to provide an improved circuit arrangement which becomes inoperative should the temperature in the rectifier stacks exceed a predetermined figure regardless of operation of the cooling fan.

A further object of the present invention is to provide a high degree of voltage control to ensure that the rectifier stacks are not subjected to severe overvoltages.

Various other objects and advantages will become apparent from the detailed description to follow.

The figure is a wiring diagram of the direct current supply for multiple electrical welding units showing provisions for supplying several welders from the same supply.

Referring more particularly to the figure, the three-phase voltage supply 10 supplies alternating current power to the input leads of the power supply. The input leads are connected through the three-pole switch 12 to the windings of the auto-transformer 14 which increases the voltage per phase from 440 volts to 480 volts, for example. The three-pole switch is closed by the energization of the relay coil 16 which has one terminal 13 connected to one line 15 of the three-phase input 10. The other terminal 17 of the coil 16 is connected through the normally closed stop push button 18 to one terminal of the normally open start switch 20 and to one terminal of the thermal responsive switch 22. The other terminals of the switches 20 and 22 are connected together to a second one of the alternating current voltage leads 19. A fan motor 24 is connected across the three-phase input and the fan blades thereof are positioned so as to direct a stream of air over the thermal responsive switch 22. It will be understood that the switch 22 will open when the fan 24 is not operating or the temperature in the selenium rectifier stacks is too high. On the other hand, if desired, a separate pyrometer may be employed which is responsive to excess temperature in the stacks and which is in series with the fan switch 22 to open the circuit to the coil 16 and thus open the three-pole switch 12.

The output of the auto transformer is connected to the Y-connected primary 26 of the three-phase transformer 28. Inserted in each of the three leads between the auto transformer and the transformer primary is the primary winding 30 of a magnetic amplifier 32. Each magnetic amplifier 32 is a separate unit having its own primary and control windings. The secondary 36 of the transformer 28 is a three-phase delta connected winding. The Y-delta connection of the transformer 28 is used to provide for circulation of third harmonics in the secondary of the transformer. These harmonics react on the primary magnetizing current to improve the wave form of the primary voltage which is useful in providing better voltage regulation. This is also of importance for proper operation of the magnetic amplifiers since good wave forms are necessary for operation of these units.

The output of the secondary is connected to the three-phase selenium rectifier 38 and the direct current output of the rectifier is connected through the three control windings 40 of the magnetic amplifier 32 to the welders. The selenium rectifier is heavily overloaded in use but by the effective utilization of the fan and circuit breakers, operation is effectively brought about. In actual use the rectifiers have been operated at as much as four or five times overload. A resistor 42 is connected across the direct current output and connected across a portion of the resistor 42 are three control windings 44 of the magnetic amplifiers, the control windings being connected in series. Connected in series with the windings 44 is the bias voltage supply 34 which provides a voltage that is larger in amplitude than the voltage taken across the resistor 42, the bias voltage being connected to oppose that voltage. The third control windings 46 of the magnetic amplifier are connected in series to a supply of reference voltage 48 which is connected across two of the three phases of the alternating current supply. Supply 48 is designed to vary the flux in control windings 46 so that as the alternating input voltage varies, the impedance of the primary windings 30 is varied to maintain the output voltage constant. This result may be accomplished in many ways, one of which is to provide a rectifier and an opposing biasing potential which exceeds the potential supplied by the rectifier, exactly as described with respect to the operation of windings 44.

As above pointed out, the direct current output is connected through the control windings 28 of the magnetic amplifier to the welding units. The output is connected to the bus 50 which in turn is connected through the six knife switches 52 to the six similar welding units 54, the circuit details of one of which is shown at 54'. As there shown, the welding unit is comprised of a plurality of resistors 55, six as shown, the resistances of which vary so as to give a range of output current, depending upon the resistors in circuit, from 10 to 310 amperes. One end of each resistor is connected to one terminal of the knife switch 52 and the opposing terminals are normally unconnected but may, by manual actuation of selected switches, be connected in parallel to the terminal 56. The latter terminal, in turn is connected to an electrode 58 of a welding unit, while the work piece is grounded.

As fully described in my copending application, filed of even date, the resistors are for the most part of different values so as to provide for a wide range of welding currents. Each set of resistors 55 is carried in a separate removable drawer as at 57 which drawers are commonly mounted in a supporting framework in which the bus 50 is mounted, the individual knife switches being closed when the drawer is in its closed relationship. The terminal 56 is on the front panel of the drawer and may be connected to any one or combination of resistors 55 by means manually actuated, such as switch plungers.

When starting up the welder, the switch 20 is closed, thereby closing the circuit through the coil 16. This closes the contacts of the switch 12, thereby energizing the fan motor 24. The fan cools the thermal responsive switch 22 and after a predetermined time the switch 22 will be closed, thereby shunting the switch 20. The coil 16 therefore will remain energized until either the fan motor stops operating due to breakdown or overheating in the rectifier stacks 38 occurs or the stop switch 18 is manually opened to deenergize the coil 16.

The magnetic amplifiers 32 operate to maintain the output voltage constant in response to the signals supplied to the control windings 40, 44 and 46. If the supply voltage falls, which would tend to decrease the output voltage, the reference supply voltage 48 increases the current through the control windings 46. This decreases the impedance of the primary windings 30, thereby decreasing the voltage drop through these windings and therefore maintaining the output voltage constant.

The bias voltage 34 is normally greater than the voltage taken off across the resistor 42 and opposes this voltage. Therefore, if the voltage across the output rises, the current through the control windings 44 decreases and the impedance of the primary windings 30 therefore increases. This produces a greater voltage drop in these windings and re-establishes the output voltage.

The control windings 40 of the magnetic amplifier carry the full load current of the supply. Since the number of welders in use at any one time will vary and the current being drawn by any one welder can be varied, as above described, the current through the control windings 40 will change from rather small to very large magnitudes. Therefore, the magnetic amplifiers are made so that the windings 40 will have relatively little effect upon the impedance of the primary windings. However, large current changes will have an effect on the impedance and tend to regulate the output voltage. If there is a large increase in the output current the impedance of the primary windings 30 will be reduced, thereby tending to raise the output voltage so as to take care of the increased voltage drops throughout the system.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. An electric welder direct current supply comprising a magnetic amplifier having a primary winding and three control windings, a rectifier, said rectifier coupled to said primary winding, a plurality of individually operable welding units, the output of said rectifier being connected to said welding units through one of said control windings, means for supplying a portion of the output voltage to another of said control windings, and the third of said control windings being connected to receive a portion of the supply voltage.

2. An electric welder direct current supply comprising a magnetic amplifier having a primary winding and three control windings, a selenium rectifier, said rectifier coupled to said primary winding, a plurality of individually operable welding units, the output of said rectifier being connected to said welding units through one of said control windings, means for supplying a portion of the output voltage to another of said control windings, and the third of said control windings being connected to receive a portion of the supply voltage.

3. A direct current supply for electric welder units comprising three magnetic amplifiers, each of said amplifiers having a primary winding and three control windings, each of said primary windings being connected to one phase of a three phase supply, a three phase rectifier, said rectifier coupled to said primary windings, at least one welding unit, the output of said rectifier being connected to said welding unit through one of the control windings of each of said amplifiers, said windings being connected in series, a source of bias voltage, a portion of the output voltage of said rectifier being connected to a series circuit comprising said bias voltage source and a second control winding of each of said amplifiers, and means for supplying a voltage which is responsive to variations in the supply voltage to the third of said control windings connected in series.

4. A direct current supply for electric welder units comprising three magnetic amplifiers, each of said amplifiers having a primary winding and three control windings, each of said primary windings being connected to one phase of a three phase supply, a three phase selenium rectifier, said rectifier coupled to said primary windings, at least one welding unit, the output of said rectifier being connected to said welding unit through one of the control windings of each of said amplifiers, said windings being connected in series, a source of bias voltage, a portion of the output voltage of said rectifier being connected to a series circuit comprising said bias voltage source and a second control winding of each of said amplifiers, and means for supplying a voltage which is responsive to variations in the supply voltage to the third of said control windings connected in series.

5. A direct current supply for electric welders comprising three magnetic amplifiers, each amplifier having a primary winding and at least two control windings, each of said primary windings being connected to one phase of a three phase alternating current supply, a three phase rectifier, said rectifier coupled to said primary windings, a three pole switch connected between said magnetic amplifiers and the three phase supply, a fan motor to receive three phase power, means for initially closing said three pole switch, means for maintaining said switch closed in response to continued operation of said fan motor, at least one welding unit, said unit connected in series with one control winding of each magnetic amplifier to the output of said rectifier, a source of bias voltage, said source and a second control winding of each of said magnetic amplifiers connected in series to receive a portion of the output voltage of said rectifier, the bias voltage and the output voltage of said rectifier being connected to oppose each other.

6. A direct current supply for electric welders comprising three magnetic amplifiers, each amplifier having a primary winding and at least two control windings, each of said primary windings being connected to one phase of a three phase alternating current supply, a three phase rectifier, said rectifier coupled to said primary windings, a three pole switch connected between said magnetic amplifiers and the three phase supply, a fan motor to receive three phase power, means for initially closing said three pole switch, means for maintaining said switch closed in response to continued operation of said fan motor, at least one welding unit, said unit connected in series with one control winding of each magnetic amplifier to the output of said rectifier, a source of bias voltage, said source and a second control winding of each of said magnetic amplifiers connected in series to receive a portion of the output voltage of said rectifier, the bias voltage and the output voltage of said rectifier being connected to oppose each other, a plurality of different value resistors and means for connecting any desired number of said resistors between said welding unit and the output of said rectifier.

7. A direct current supply for electric welders comprising three magnetic amplifiers, each amplifier having a primary winding and at least two control windings, each of said primary windings being connected to one phase of a three phase alternating current supply, a three phase rectifier, said rectifier coupled to said primary windings, a three pole switch connected between said magnetic amplifiers and the three phase supply, a fan motor to receive three phase power, means for initially closing said three pole switch, means for maintaining said switch closed in response to continued operation of said fan motor, at least one welding unit, said unit connected in series with one control winding of each magnetic amplifier to the output of said rectifier, a source of bias voltage, said source and a second control winding of each of said magnetic amplifiers connected in series to receive a portion of the output voltage of said rectifier, the bias voltage and the output voltage of said rectifier being connected to oppose each other, a plurality of different value resistors and means for connecting any desired number of said resistors between said welding unit and the output of said rectifier, the magnetic amplifier being relatively insensitive to current changes in the control windings connected in series with the rectifier output.

References Cited in the file of this patent
UNITED STATES PATENTS

| | | |
|---|---|---|
| 1,959,513 | Weyandt | May 22, 1934 |
| 2,068,883 | Klinkharner | Jan. 26, 1937 |
| 2,077,114 | Klinkharner et al. | Apr. 13, 1937 |
| 2,082,607 | Amsden | June 1, 1937 |
| 2,171,512 | Crout | Aug. 29, 1939 |
| 2,179,299 | Murcek | Nov. 7, 1939 |
| 2,188,436 | Hugus | Jan. 30, 1940 |